(12) United States Patent
Hietmann et al.

(10) Patent No.: US 6,556,891 B2
(45) Date of Patent: Apr. 29, 2003

(54) APPARATUS SYSTEM AND CONTROL BOX FOR SAME

(75) Inventors: Gerhard Hietmann, Herbertshofen (DE); Thomas Finsterwalder, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 0 days.

(21) Appl. No.: 09/893,721

(22) Filed: Jun. 28, 2001

(65) Prior Publication Data

US 2001/0047224 A1 Nov. 29, 2001

(30) Foreign Application Priority Data

Jul. 1, 2000 (DE) .......................................... 100 32 096

(51) Int. Cl.⁷ .............................................. G05B 19/00
(52) U.S. Cl. ...................... 700/245; 700/248; 700/249; 700/256; 700/264; 701/23; 901/3; 901/48
(58) Field of Search ................................ 700/245, 249, 700/264, 256; 701/23; 345/169, 158, 161; 901/3, 48; 361/680, 683

(56) References Cited

U.S. PATENT DOCUMENTS

| | | | | |
|---|---|---|---|---|
| 4,613,943 A | * | 9/1986 | Miyake et al. | 700/248 |
| 4,757,180 A | * | 7/1988 | Kainz et al. | 219/137.2 |
| 4,829,219 A | * | 5/1989 | Penkar | 700/249 |
| 4,888,708 A | * | 12/1989 | Brantmark et al. | 700/264 |
| 6,131,436 A | * | 10/2000 | O'Bannon et al. | 73/7 |
| 6,134,102 A | * | 10/2000 | Worn et al. | 361/680 |
| 6,145,403 A | * | 11/2000 | Aschenbrenner et al. | 74/490.01 |
| 6,163,124 A | * | 12/2000 | Ito et al. | 700/252 |
| 6,356,806 B1 | * | 3/2002 | Grob et al. | 700/245 |
| 6,362,813 B1 | * | 3/2002 | Worn et al. | 345/169 |

FOREIGN PATENT DOCUMENTS

| | | |
|---|---|---|
| DE | 37 86 944 T2 | 11/1993 |
| DE | 198 46 960 A1 | 4/2000 |

OTHER PUBLICATIONS

Kuka, High–tech off the shelf: KR C2 controller, 2000, Internet, pp. 1–4.*
Kuka, Our versatile all–rounder for small loads compact—fast—reliable, 200.*
Kuka, Like the Kuka pc–based controller and software, 2001, Internet, pp. 1–8.*
Bottenfeld, Injection moulding technology: unirob R5–R70, 2000, Internet, pp. 1–26.*
Kuka Roboter GmbH, System architectures for industrial robot controllers, 1998, Internet, pp. 2–9.*
Brantmark et al. Man/machine communication in ASEA's new robot controller, 1982 ASEA Journal, vol. 55 No. 6, pp. 145–150.*
Kuka, Specification—Control cabinet, 1998, Internet, pp. 1–22.*
Kuka, Build on Kuka's optimized systems engineering with uniform operator control, 2001, Internet, pp. 1–2.*
Epson, Robot Handler, 1987–1996, Internet, pp. 1–4.*

* cited by examiner

Primary Examiner—William A. Cuchlinski, Jr.
Assistant Examiner—McDieunel Marc
(74) Attorney, Agent, or Firm—McGlew and Tuttle, P.C.

(57) ABSTRACT

An apparatus system is provided with at least one robot and with a control unit accommodated in a control cabinet. To improve the integration of robot and technology control units and to utilize synergistic effects, at least one additional, independent electronic system different from the control unit for the robot is provided accommodated in the control cabinet.

39 Claims, 1 Drawing Sheet

APPARATUS SYSTEM AND CONTROL BOX FOR SAME

FIELD OF THE INVENTION

The present invention pertains to an apparatus system with at least one robot, with a first control unit accommodated in a control cabinet for the robot, and to a control cabinet for an apparatus system with at least one robot, and with a first control unit accommodated in the control cabinet for the robot.

BACKGROUND OF THE INVENTION

Robots often do not operate in an isolated manner, but together in a system of robots. They can operate essentially independently from one another and process, e.g., parts that are of the same design but different and are fed to them by a common feed means, e.g., a belt, in the same manner. However, robots are frequently used in a system for the joint processing of a workpiece, e.g., a vehicle body, in which case they prepare welding spots or perform other processing operations at different points of the body. It is meaningful in this case, in particular, to coordinate the control of the mode of operation and of the operating sequence of the robots with one another. One or more robots may also cooperate with other independent apparatuses, devices or machines, e.g., conveying means.

If robots operate one way or another in a narrow space in a system, optionally also with other apparatuses, etc., each robot and each apparatus now has a control cabinet of its own, so that a plurality of control cabinets also must likewise be provided in the case of several robots or a plurality of robots working together with one another in their vicinity, but outside their range of action. This is extremely disadvantageous. It is sometimes extremely difficult to arrange the control cabinet of a robot outside the range of action of another robot. Moreover, the accessibility to the working areas or the ranges of action of the robots, e.g., for feeding workpieces to be processed or the like, is hindered by the plurality of control cabinets present.

An individual robot also often has additional apparatuses, such as welding tongs, screwdrivers, bonding devices, sensors or the like, whose control units or associated electronics are accommodated in separate housings that are independent from the control cabinet of the robot.

SUMMARY AND OBJECTS OF THE INVENTION

The basic object of the present invention is therefore to provide an optimized apparatus system while avoiding the above-mentioned drawbacks.

To accomplish this object, the present invention provides for an apparatus system of this type, in which the control cabinet for controlling the robot contains at least one additional, independent electronic system that is different from the control unit for the robot. The present invention also makes provisions for a control cabinet of the aforementioned type to be designed with an additional, independent electronic system that is contained in the control cabinet and is different from the first control unit for the robot.

Such an additional electronic system has a functional unit of its own, which is especially different from that of the control unit of the robot itself.

However, a central control cabinet, which contains such additional electronic systems, especially technology control units as software-programmed control units (SPSs), control unit of the robot cell, e.g., for controlling the access to the robot cell, server computers with control tasks, welding control, screwdriver control, bonding control, but also a sensor computer, image recognition systems, an interruption-free power supply unit of its own, interface modules and similar components, particularly tools directly working on work pieces, is also advantageous with one robot.

Provisions are made in a preferred embodiment for the control cabinet to contain as an additional electronic system at least one additional, independent control unit for at least one independent apparatus that is different from the robot, in which case the control cabinet contains at least one additional control unit for at least one additional robot as an additional electronic system.

Provisions may be made in another preferred embodiment for a common control cabinet to contain additional (supplementary) electronic components, such as servers, back-up units, PLC, interface units, redundant equivalent control units, technology control units, etc., for use in the system of robots, besides the control units necessary for the system of robots and for other independent apparatuses.

Provisions are made in other embodiments of the central control cabinet according to the present invention for free installation places to be present for additional components and for a software memory-programmable control unit to be integrated in the central control cabinet. Finally, the central control cabinet may have a common active or passive heat removal means.

A central control cabinet for a system of robots, especially if the individual robots cooperate closely, is a preferred application of the present invention.

Many of the hitherto necessary control cabinets are now avoided by the present invention and reduced to a common, central control cabinet for a plurality of robots or other independent apparatuses. A considerable amount of space is saved as a result and, moreover, the cabling is simplified and central maintenance of the components installed in the box is made possible, because the data exchange and the cabling previously necessary are located inside the box.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
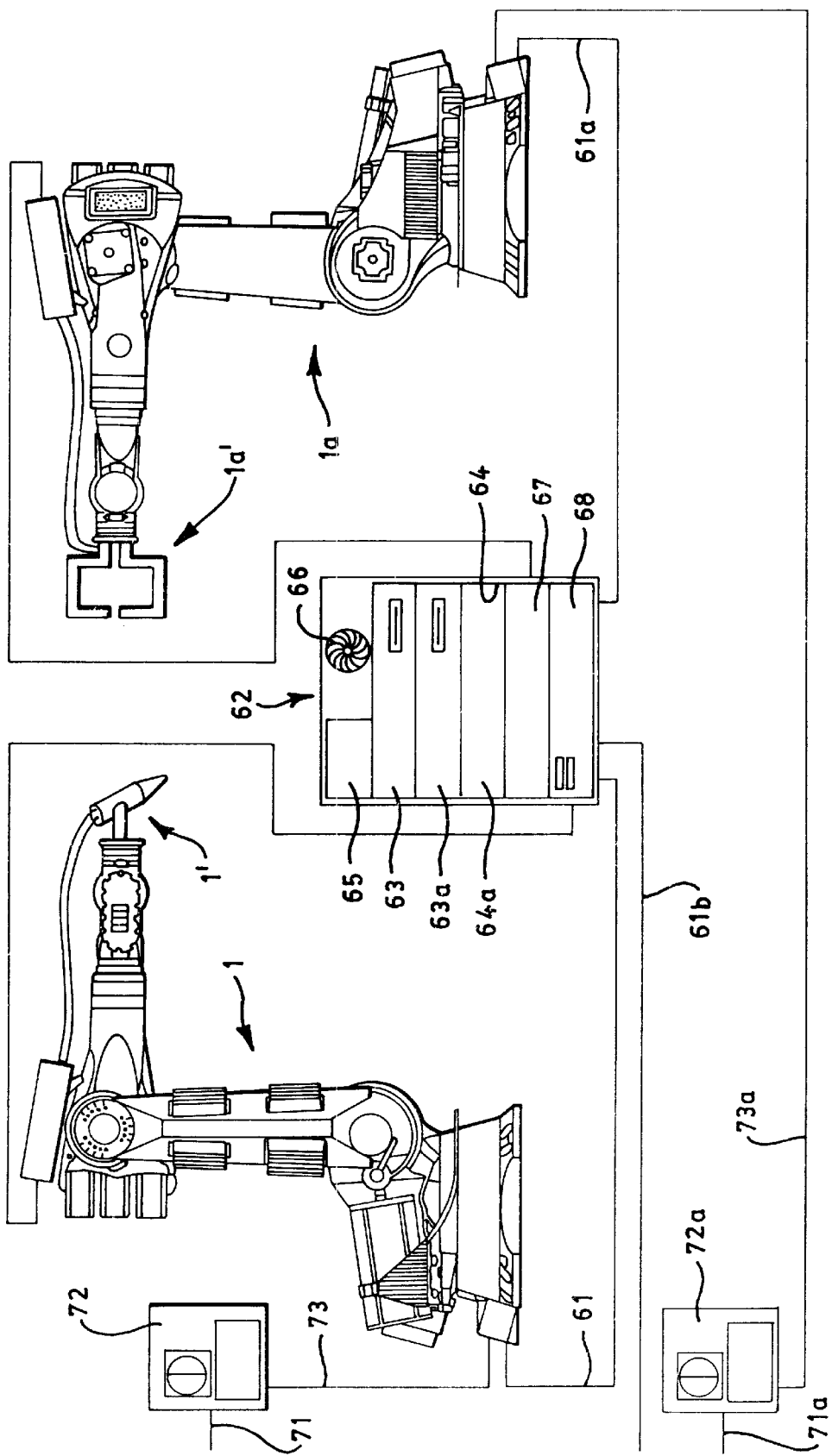
FIG. 1 is a schematic view of a system of robots according to the present invention with a central control cabinet with two robots shown.

Referring to the drawings in particular, the preferred exemplary embodiment represented shows an apparatus system in the form of a system of robots with at least two, but usually more than two robots 1, 1a, which cooperate, e.g., one after another on a workpiece, e.g., a motor vehicle body, e.g., prepare welding spots or perform bonding in different areas there and whose operation (working movement, operating sequence) may optionally be coordinated with one another, but does not have to be. The robot 1 is a bonding robot with a bonding device 1', while the robot 1' is a welding robot with welding tongs 1a'. The present invention is basically also used in the case of a plurality of robots which work independently from one another and also process or handle different workpieces, especially workpieces of the same design.

Thus, FIG. 1 shows two robots 1, 1a, which are connected via control lines 61, 61a to a common, central control cabinet 62. Additional robots may also be connected to the central control cabinet 62 via control lines, such as a control line 61b shown. The central control cabinet 62 has, in particular, a control unit 63, 63a, e.g., in the form of a standard 19" rack, for each robot. The control cabinet 62 may have additional rack places 64, e.g., 19" rack places, of which only one is shown as an example, and into which additional electronic means 64a, such as servers, safety means, a technology control unit, software memory-programmed control units, etc., can be introduced. It is advantageous, in particular, to provide common and therefore central elements, e.g., especially an interruption-free power supply unit 65 and a common active or passive heat removal means 66 for the entire control cabinet 62. The control cabinet 62 also has control units 67, 68 for the units or tools 1', 1a' of the robots, namely, a bonding control unit 67 for the bonding unit 1' and a welding control unit 68 for the welding tongs 1a'.

While, as was stated, the robots 1, 1a are controlled via the control lines 61, 61a, 61b, the robots 1, 1a are supplied with power from power supply lines 71, 71a via power supply boxes 72, 72a associated with each robot and from these to the particular robot 1, 1a via lines 73, 73a.

The control concept described supports especially the decentralized drive technique with drive units which are arranged in or on the robot mechanisms.

While specific embodiments of the invention have been shown and described in detail to illustrate the application of the principles of the invention, it will be understood that the invention may be embodied otherwise without departing from such principles.

What is claimed is:

1. An apparatus system comprising:
   at least one robot;
   a control cabinet including a rack with rack places;
   a control unit for said robot, said control unit being accommodated in said control cabinet;
   at least one additional electronic system accommodated in said control cabinet, said additional electronic system being independent and different from said control unit for said robot.

2. A system in accordance with claim 1, further comprising:
   at least one independent apparatus different from said robot, wherein said additional electronic system includes an additional independent control unit for said independent apparatus different from said robot.

3. A system in accordance with claim 1, further comprising:
   an additional robot, wherein said additional electronic system includes at least one additional control unit for said additional robot.

4. A system in accordance with claim 1, further comprising
   at least one additional control unit installed in said central control box; and
   at least one tool connected to said additional control unit.

5. A system in accordance with claim 1,
   a plurality of additional robots; and
   a plurality of additional control units each in said central control box and connected to said plurality of additional robots for respectively controlling each said connected robots.

6. A system in accordance with claim 5, further comprising:
   an additional electronic unit including at least one of a server and an archiving unit is provided for all of said control units contained in said control cabinet as well as for said connected robots.

7. A system in accordance with claim 5, further comprising a power system for supplying the robots with power, said power system including either a power supply box that is separate for each robot or a central power supply connected to each of the robots via corresponding components in said central control cabinet.

8. A system in accordance with claim 1, wherein said central control cabinet is a 19" rack standard module.

9. A system in accordance with claim 1, wherein said central control cabinet has free installation places for the integration of additional components for the apparatus system.

10. A system in accordance with claim 1, further comprising: a software memory-programmable control unit in said central cabinet.

11. A system in accordance with claim 1, further comprising:
    an uninterruptible power supply provided in said central control cabinet.

12. A system in accordance with claim 1, further comprising a central interface unit in said central control cabinet.

13. A system in accordance with claim 1, wherein said central control cabinet is provided with a said common active or passive heat removal device.

14. A system in accordance to claim 1, wherein said control cabinet is provided with a common active or passive heat removal device.

15. A control cabinet for an apparatus system with at least one robot, the control cabinet including a rack with rack places and comprising:
    a first control unit accommodated in the control cabinet for controlling said robot;
    at least one additional independent electronic system, which is different from said first control unit for said robot, said at least one additional independent electronic system being contained in the control cabinet.

16. A control cabinet in accordance with claim 15, further comprising:
    an additional independent control unit for at least one independent apparatus different from the robot.

17. A control cabinet in accordance with claim 15, further comprising:
    an additional control unit in the control cabinet for each additional connected robot.

18. A control cabinet in accordance with claim 15, wherein the box includes plug-in installation places for integrating additional components for the apparatus system.

19. A control cabinet in accordance with claim 15, further comprising
    a software memory-programmable control unit integrated into the control cabinet.

20. A control cabinet in accordance with claim 15, further comprising a central interruption-free power supply unit.

21. A control cabinet in accordance with claim 15, further comprising a common active or passive heat removal device for the components contained in the central box.

22. An apparatus system comprising:
- at least one robot;
- a control cabinet;
- a control unit for said robot, said control unit being accommodated in said control cabinet;
- at least one additional electronic system accommodated in said control cabinet, said additional electronic system being independent and different from said control unit for said robot; and
- an additional robot, wherein said additional electronic system includes at least one additional control unit for said additional robot.

23. A system in accordance with claim 22, further comprising a software memory-programmable logic control in said control cabinet.

24. A system in accordance with claim 22, further comprising an uninterruptible power supply provided in said control cabinet.

25. A system in accordance with claim 22, further comprising a central interface unit in said control cabinet.

26. An apparatus system comprising:
- at least one robot;
- a control cabinet;
- a control unit for said robot, said control unit being accommodated in said control cabinet;
- at least one additional electronic system accommodated in said control cabinet, said additional electronic system being independent and different from said control unit for said robot;
- at least one additional control unit installed in said control cabinet; and
- at least one tool connected to said additional control unit.

27. A system in accordance with claim 26, further comprising:
- a plurality of additional robots; and
- a plurality of further control units disposed in said control cabinet and connected to said plurality of additional robots for respectively controlling each of said additional robots.

28. A system in accordance with claim 27, further comprising:
- an additional electronic unit including at least one of a server and an archiving unit for each of said control unit, said at least one additional control units and said further control unit and for said robot and said additional robots.

29. A system in accordance with claim 27, further comprising a power system for supplying the robots with power, said power system including either a power supply cabinet that is separate for each robot or a central power supply connected to each of the robots via corresponding components in said control cabinet.

30. A system in accordance with claim 26, further comprising a software memory-programmable control unit in said control cabinet.

31. A system in accordance with claim 26, further comprising an uninterruptible power supply provided in said control cabinet.

32. A system in accordance with claim 26, further comprising a central interface unit in said control cabinet.

33. A system in accordance to claim 26, wherein said control cabinet is provided with a common active or passive heat removal device.

34. An apparatus system comprising:
- at least one robot;
- a control cabinet;
- a control unit for said robot, said control unit being accommodated in said control cabinet; and
- at least one additional electronic system accommodated in said control cabinet, said additional electronic system being independent and different from said control unit for said robot, wherein said control cabinet is a 19 inch rack standard module.

35. A system in accordance with claim 34, wherein said control cabinet has free installation places for the integration of additional components for the apparatus system.

36. A system in accordance with claim 34, further comprising a software memory-programmable control unit in said control cabinet.

37. A system in accordance with claim 34, further comprising an uninterruptible power supply provided in said control cabinet.

38. A system in accordance with claim 34, further comprising a central interface unit in said control cabinet.

39. A system in accordance to claim 34, wherein said control cabinet is provided with a common active or passive heat removal device.

* * * * *